United States Patent
Marin et al.

(10) Patent No.: US 9,591,463 B2
(45) Date of Patent: Mar. 7, 2017

(54) CLOSED GROUP WIRELESS LOCAL AREA NETWORK PROVISIONING

(75) Inventors: Janne Marin, Espoo (FI); Jukka Reunamaki, Tampere (FI); Petri Antero Tuominen, Nivala (FI)

(73) Assignee: Nokia Technologies Oy, Espoo (FI)

( * ) Notice: Subject to any disclaimer, the term of this patent is extended or adjusted under 35 U.S.C. 154(b) by 255 days.

(21) Appl. No.: 13/822,871

(22) PCT Filed: Sep. 14, 2010

(86) PCT No.: PCT/IB2010/002272
§ 371 (c)(1),
(2), (4) Date: Jun. 4, 2013

(87) PCT Pub. No.: WO2012/035366
PCT Pub. Date: Mar. 22, 2012

(65) Prior Publication Data
US 2013/0324178 A1    Dec. 5, 2013

(51) Int. Cl.
*H04B 7/00* (2006.01)
*H04W 4/08* (2009.01)
(Continued)

(52) U.S. Cl.
CPC ............. *H04W 4/08* (2013.01); *H04W 8/186* (2013.01); *H04W 48/18* (2013.01)

(58) Field of Classification Search
CPC ....... H04W 36/04; H04W 36/14; H04W 4/00; H04W 12/06; H04W 36/30; H04W 48/18;
(Continued)

(56) References Cited

U.S. PATENT DOCUMENTS

| 2003/0058808 A1* | 3/2003 | Eaton | H04W 4/02 370/310 |
| 2005/0149443 A1* | 7/2005 | Torvinen | A63F 13/12 705/51 |

(Continued)

FOREIGN PATENT DOCUMENTS

| CN | 101044774 A | 9/2007 |
| EP | 1507393 A1 | 2/2005 |

(Continued)

OTHER PUBLICATIONS

"H(e)NB Discovery with ANDSF", 3GPP TSG SA WG2 Meeting #72, TD S2-092369, Agenda: 7.4.1, Motorola, Mar. 30-Apr. 3, 2009, pp. 1-2.

(Continued)

*Primary Examiner* — Golam Sorowar
(74) *Attorney, Agent, or Firm* — Pedro F. Suarez, Esq.; Mintz Levin Cohn Ferris Glovsky and Popeo, P.C.

(57) ABSTRACT

Methods and apparatus, including computer program products, are provided for provisioning a closed group of user equipment. In some embodiments, there is provided a method. The method may include receiving one or more first messages indicating a closed group comprising at least one of a plurality of user equipment; generating provisioning information for the closed group; and sending one or more second messages including the provisioning information to the at least one of the plurality of user equipment. Related apparatus, systems, methods, and articles are also described.

19 Claims, 8 Drawing Sheets

(51) Int. Cl.
*H04W 8/18* (2009.01)
*H04W 48/18* (2009.01)

(58) Field of Classification Search
CPC ....... H04W 40/02; H04W 4/001; H04W 4/02; H04W 8/26; H04W 84/105; H04W 12/04; H04W 28/26; H04W 36/0072; H04W 48/16
See application file for complete search history.

(56) References Cited

U.S. PATENT DOCUMENTS

| | | | |
|---|---|---|---|
| 2006/0053208 A1 | 3/2006 | Laurila et al. | |
| 2008/0028450 A1* | 1/2008 | Zhao | H04W 4/08 726/6 |
| 2008/0034064 A1* | 2/2008 | Choi | G06F 21/10 709/219 |
| 2008/0208963 A1 | 8/2008 | Eyal et al. | |
| 2008/0281923 A1 | 11/2008 | Barchi | |
| 2009/0247129 A1* | 10/2009 | Lee et al. | 455/411 |
| 2009/0270092 A1 | 10/2009 | Buckley et al. | |
| 2009/0305671 A1* | 12/2009 | Luft et al. | 455/411 |
| 2010/0048161 A1* | 2/2010 | He et al. | 455/404.1 |
| 2010/0223359 A1* | 9/2010 | Runstedler | H04W 4/08 709/219 |
| 2010/0278336 A1* | 11/2010 | Tahan | G06F 21/606 380/46 |
| 2010/0325194 A1* | 12/2010 | Williamson | H04W 4/02 709/203 |
| 2011/0039594 A1* | 2/2011 | Liu | H04W 48/02 455/515 |
| 2011/0082939 A1* | 4/2011 | Montemurro | H04W 76/023 709/227 |
| 2011/0177814 A1* | 7/2011 | Buchmayer | H04L 63/104 455/435.1 |

FOREIGN PATENT DOCUMENTS

| | | |
|---|---|---|
| EP | 2117261 A1 | 11/2009 |
| KR | 20100069130 A | 6/2010 |
| WO | 2010087663 A2 | 8/2010 |

OTHER PUBLICATIONS

Extended European Search Report received for corresponding European Patent Application No. 10857206.6, dated Jan. 23, 2014, 8 pages.

International Search Report and Written Opinion received for corresponding Patent Cooperation Treaty Application No. PCT/IB2010/002272, dated May 24, 2011, 13 pages.

Open Mobile Alliance (OMA); "Standardized Connectivity Management Objectives; WLAN Parameters"; For use with OMA Device Management; Approved Version 1.0; Oct. 24, 2008; abstract. 17 pages.

3GPP TS 24.312; Version 9.0.0; Dec. 2009; 3rd Generation Partnership Project; Technical Specification Group Core Network and Terminals; Access Network Discovery and Selection Function (ANDSF) Management Object (MO); (Release 9); Retrieved from the internet: http://www.3gpp.org/ftp/specs/html-info/24312.htm. 4 Pages.

* cited by examiner

FIG. 5

CLOSED GROUP WIRELESS LOCAL AREA NETWORK PROVISIONING

RELATED APPLICATION

This application was originally filed as PCT Application No. PCT/IB2010/002272 filed Sep. 14, 2010.

FIELD

The subject matter disclosed herein relates to provisioning.

BACKGROUND

It is increasingly common for wireless devices to support a variety of different network technologies including, for example, global system for mobile communications (GSM), wideband code division multiple access (WCDMA), worldwide interoperability for microwave access (WiMAX), WiFi, and the like. Moreover, many of the wireless devices are multi-mode, enabling the wireless device to switch operation between the different network technologies.

Network discovery, selection, and provisioning technologies facilitate and automate the discovery/selection of networks and allow network operators to handle interoperability between different network technologies. To that end, standards are being developed to facilitate network discovery, selection, and provisioning. Some of these standards include: the $3^{rd}$ Generation Partnership Project, Technical Specification Group Core network and Terminals, Access Network Discovery and Selection Function (ANDSF) Management Object (Release 9), 3GPP TS 24.312 V.9.0.0 (2009-12) (referred to herein as the "ANDSF standard"); and the Standardized Connectivity Management Objects, WLAN parameters, For use with OMA Device Management, Approved Version 1.0, 24 Oct. 2008 (referred to herein as the "OMA standard").

SUMMARY

Methods and apparatus, including computer program products, are provided for provisioning a closed group of user equipment. In some embodiments, there is provided a method. The method may include receiving one or more first messages indicating a closed group comprising at least one of a plurality of user equipment; generating provisioning information for the closed group; and sending one or more second messages including the provisioning information to the at least one of the plurality of user equipment.

In some other embodiments, there is provided a method. The method may include providing one or more first messages indicating a closed group comprising at least one of a plurality of user equipment, the closed group sharing provisioning information; and receiving one or more second messages including the provisioning information for the at least one of the plurality of user equipment.

In some variations of some of the embodiments disclosed herein, one or more of the following may be included. The one or more first messages may include information identifying the closed group. The information identifying the closed group may include at least one of a mobile subscriber integrated services digital network number, an international mobile subscriber identity, and an international mobile equipment identity. The provisioning information may include policy information, discovery information, and/or location information. A device manager may generate at least one management object comprising the provisioning information for the closed group. The device manager may comprise at least one of an access network discovery and selection function or an open mobile alliance device manager. The device manager may include at least one processor and at least one memory, and may implement the receiving one or more first messages, the generating, and the sending. A user equipment may implement the providing and the receiving one or more second messages. The user equipment may include at least one processor and at least one memory. The user equipment may provide the one or more first messages to a device manager of a mobile wireless network. After the user equipment authenticates with a device manager, the user equipment may provide one or more first messages indicating a closed group sharing provisioning information. The user equipment may access at least one of a plurality of access points based on at least the provisioning information received from a device manager of a mobile wireless network.

The above-noted aspects and features may be implemented in systems, apparatus, methods, and/or articles of manufacture, such as for example a computer program product, depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings,

FIGS. 4-5 depict examples of provisioning information configured as management objects, in accordance with some example embodiments of the subject matter disclosed herein;

Figure 1:
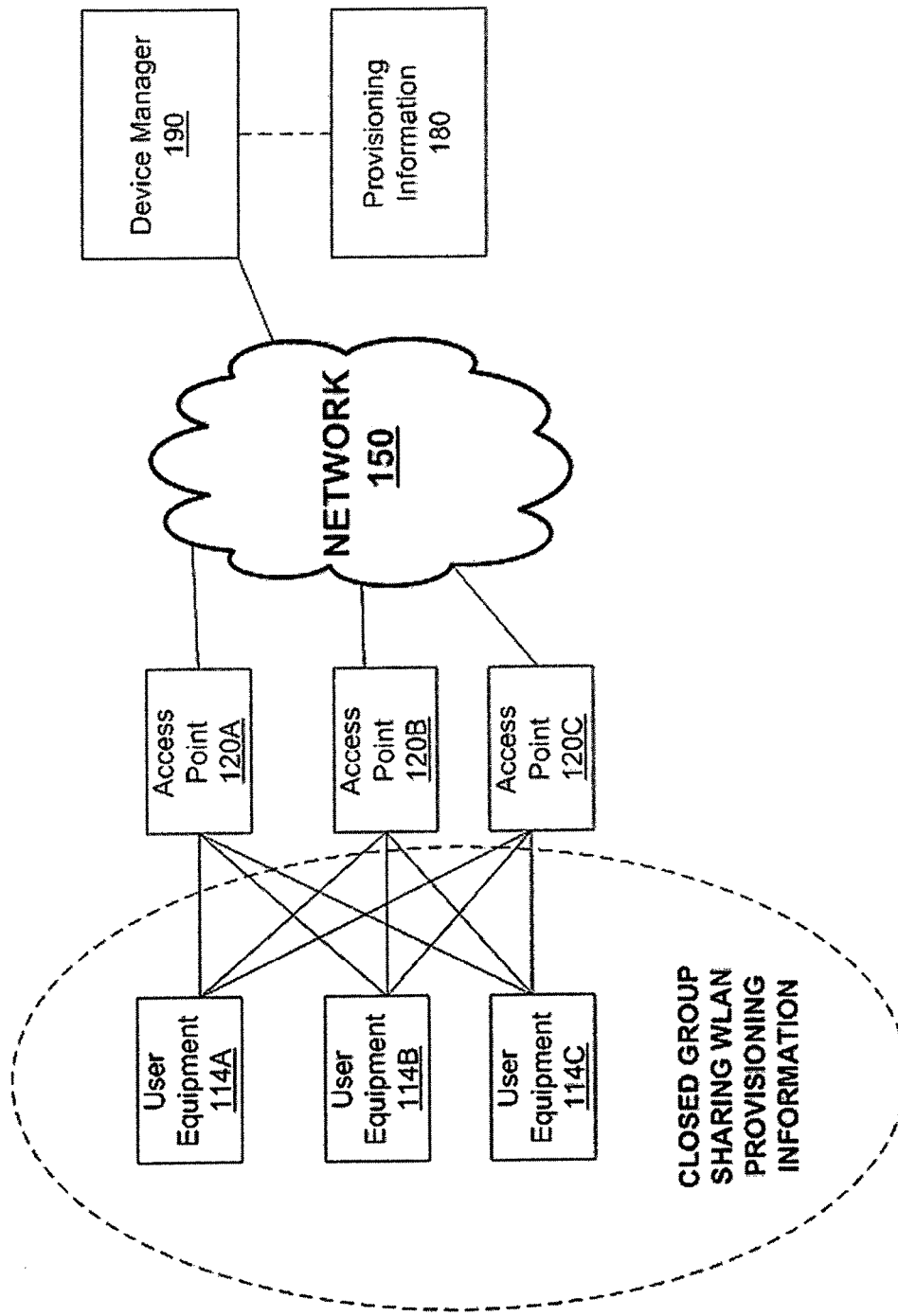
FIG. 1 depicts a block diagram of a system including an example of a device manager and user equipment, in accordance with some example embodiments of the subject matter disclosed herein.

Like labels are used to ref to same or similar items in the drawings.

DETAILED DESCRIPTION

FIG. 1 depicts a simplified functional block diagram of a wireless communication system 100 consistent with some example embodiments. The wireless communication system 100 may, in some example embodiments, include user equipment 114A-C, access points 120A-C, network 150, a device manager 190, and provisioning information 180.

In some example embodiments, the user equipment 114A-C may form a closed group. A closed group refers to a defined set of zero or more entities. For example, a closed group may comprise a pre-defined set of users (or the corresponding user equipment), and only the set of users may participate in the activities of the closed group (e.g., sharing provisioning information).

In some example embodiments, the user equipment 114A-C may wirelessly couple to an access point 120A-C to communicate via a wireless local area network (WLAN) to other networks, such as for example network 150 (e.g., a public land mobile network, the Internet, and the like). For example, user equipment 114A may transmit to, and receive from, a WiFi link and an access point, which is further coupled to another network, such as for example an operator's mobile cellular network (although an access point may couple to networks other than network 150). For example, rather than couple to network 150, the access point may couple to the user equipment via the WLAN being served by the access point; the access point may also couple to an intranet, such as a private network for a closed home security system or an automation system.

In some example embodiments, each of the user equipment 114A-C may include one or more of the following: at least one processor, at least one non-transitory computer-readable storage medium (e.g., memory, storage, and the like), a radio access mechanism, and a user interface. In some example embodiments, the user equipment 114A-C may communicate in accordance with one or more of the following standards: the IEEE 802.11 series of standards (commercially known as WiFi), the IEEE 802.16 series of standards (commercially known as WiMAX); the 3rd Generation Partnership Project, Technical Specification Group GSM/EDGE, Radio Access Network, Generic Access Network (GAN), (Release 9, 2009-12) (commercially known as unlicensed mobile access (UMA)); GERAN (GSM/EDGE Radio Access Network); UTRAN (UMTS Terrestrial Radio Access Network); E-UTRAN (Evolved UTRAN, which is also referred to as Long Term Evolution (LTE)); LTE-A (Long Term Evolution-Advanced); and any other wireless technology/standard as well as any subsequent additions or revisions to those standards.

The user equipment 114A-C may be referred to as, for example, mobile stations, mobile units, subscriber stations, wireless terminals, tablets, wireless gaming devices, and the like. The user equipment 114A-C may be implemented as a mobile device and/or a stationary device.

In some example embodiments, the access points 120A-C may be implemented as wireless access points. The access points 120A-C may be implemented in accordance with a variety of network technologies/standards, such as WiFi, WiMax, and the like. Moreover, the access points 120A-C may be implemented in accordance with a variety of 2G, 3G, and/or 4G network technologies/standards (e.g., implemented as a Node B base station, an evolved Node B base station, and/or any other network element).

In some example embodiments, the network 150 may be implemented as a network providing access to other networks, such as for example mobile cellular networks and the Internet. For example, an access point may be implemented as a WiFi access point coupled to the Internet to provide UMA (although an access point may also be implemented as an evolved Node B base station that is directly coupled to, or part of, a mobile operator's network). The network 150 may include one or more of the following network elements: base stations, Node B base stations, evolved Node B base stations, relays, cellular base station transceiver subsystems, gateways, access points, radio frequency (RF) repeaters, frame repeaters, nodes, mobile switching centers, a radio network controller, a core network, a serving gateway, a mobility management entity, a serving GPRS (general packet radio service) support node, and the like.

In some example embodiments, the device manager 190 may be implemented as a server configured to provide provisioning information 180 to network elements, such as for example user equipment 114A-C, access points 120A-C, and the like. The provisioning information 180 may include one or more of the following: policy information (e.g., preferred network connections and/or credentials for authentication); discovery information (e.g., information identifying the location of networks and network elements to which the user equipment may connect); and the location of the user equipment.

In some example embodiments, the device manager 190 is part of the mobile operator's core network (e.g., coupled to a network element, such as for example a mobile switching center (MSC), a home location register, an authentication server, and the like). The device manager 190 may include one or more of the following: at least one processor, at least one non-transitory computer-readable storage medium (e.g., memory, storage, and the like), and a network interface to couple to another network, such as for example the mobile operator's core network. In some example embodiments, the device manager 190 may be located in a home cellular network as a home device manager and/or in a visiting cellular network as a visiting device manager.

In some example embodiments, the device manager 190 may be configured as an access network discovery and selection function (ANDSF) consistent with the ANDSF standard. In some example embodiments, the device manager 190 may also be configured as Open Mobile Alliance (OMA) device manager consistent with the OMA standard. Although the ANDSF and OMA standards are described, other standards and/or technologies may be used as well.

In some example embodiments, the device manager 190 may allow user equipment 114A to indicate that provisioning information should be shared with a closed group associated with user equipment 114A. For example, the user equipment 114A may indicate to device manager 190 that user equipment 114B-C are part of a closed group with which user equipment 114A is willing to share provisioning information. The device manager 190 then provides provisioning information to user equipment 114B-C to allow user equipment 114B-C (or the network elements accessed by user equipment 114B-C) to be provisioned using some of the shared information associated with user equipment 114A. For example, the device manager 190 may provide information to the user equipment to provision access points 120B-C using the provisioning information used in connection with user equipment 114A and access point 120A. In this example, the sharing of provisioning information may simplify the configuration of wireless access points 120B-C. Moreover, the sharing of provisioning information may enable user equipment 114B-C to operate using one or more of the access points provisioned, or configured, for user equipment 114A. For example, the same access point 120A may be provisioned, or configured, for use by all of the closed group user equipment 114A-C. In this example, when a user equipment visits the WLAN serving another user equipment of the closed group, the visiting user equipment can use the access point associated with the visited WLAN. In addition, all of the closed group entities may share provisioning information to enable access to all of the access points 120A-C.

Although FIG. 1 depicts user equipment 114A-C, access points 120A-C, network 150, and device manager 190, communication system 100 may include other quantities of these devices (as well as other devices which are not shown as FIG. 1 is a simplified depiction of communication system 100). For example, the communication system 100 may include, or be coupled to, other networks including public land mobile networks ("cellular networks"), an Internet, access networks, the public switched telephone network, visited cellular networks, home cellular networks, an intranet, and the like.

Figure 2:
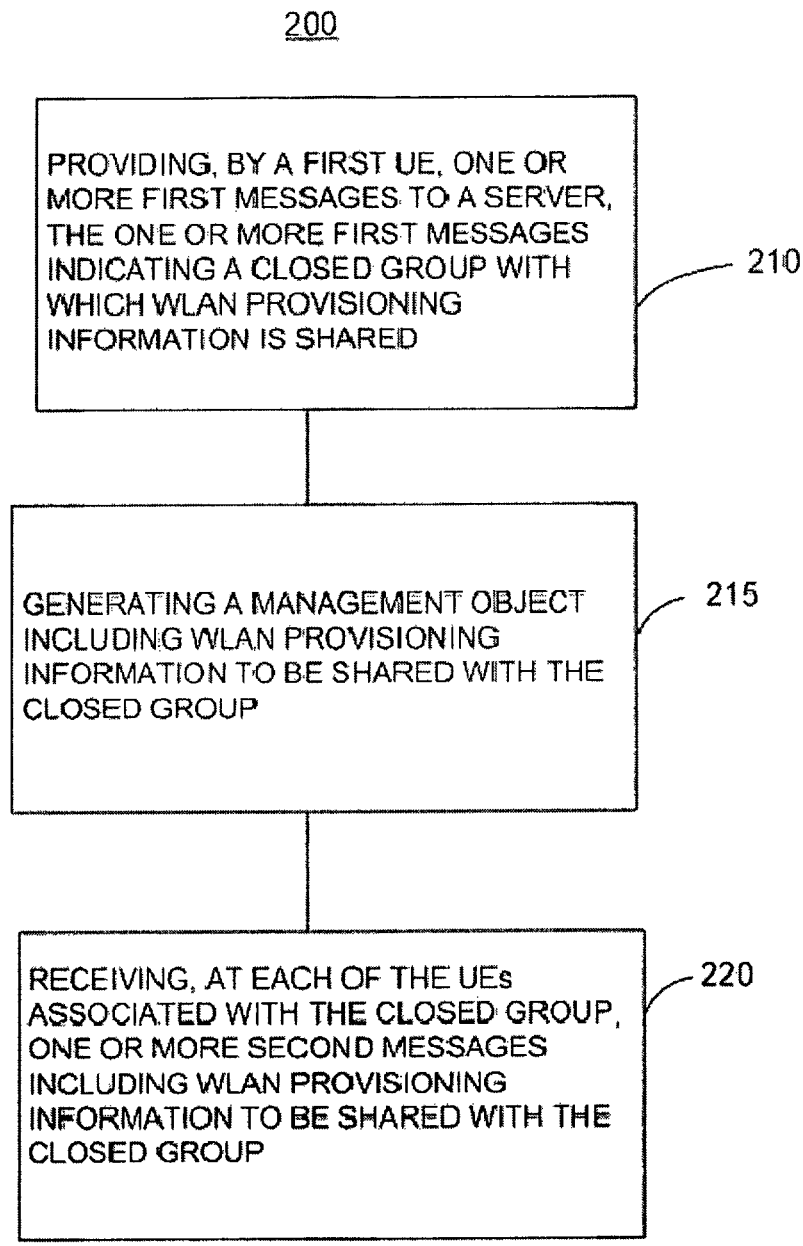
FIG. 2 depicts an example of a provisioning process, in accordance with some example embodiments of the subject matter disclosed herein.

FIG. 2 depicts a process 200 for sharing provisioning information among one or more closed group entities, such as user equipment 114A-C, in accordance with some example embodiments described herein.

In some example embodiments, the user equipment, such as for example user equipment 114A, may contact, at 210, a server, such as for example the device manager 190 to indicate that provisioning information should be shared within the closed group. For example, user equipment 114A may send one or more messages to device manager 190. The message(s) may include the identity of the members of the closed group, such as for example user equipment 114B-C. The identity of the closed group may include one or more of the following: a Mobile Subscriber Integrated Services Digital Network Number (MSISDN), an International Mobile Subscriber Identity (IMSI), an International Mobile Equipment Identity (IMEI), and/or any other mechanism to identify the user equipment and/or the user of the user equipment.

In some example embodiments, the message(s) sent at 210 may include provisioning information associated with the user equipment 114A, so that the provisioning information can be shared with the other entities of the closed group; such information may include: policy information (e.g., preferred network connections and/or credential information used to authenticate to a network element, such as an access point), discovery information (e.g., the location of networks and network elements to which the user equipment may connect, such as the location and/or internet protocol address of the device manager 190, the access point, and the wireless operator's network); and location information (e.g., the location of the user equipment 114A). Examples of provisioning information are further described below with respect to FIG. 3.

In some example embodiments, the message sent at 210 prompts the device manager 190 to retrieve one or more portions of the provisioning information from network elements including the user equipment.

In some example embodiments, the message at 210 may be sent after the user equipment 114A authenticates itself with the device manager 190 using credential information received during a bootstrapping mechanism In some example embodiments, the device manager 190 may generate, at 215, an object, such as for example a management object, configured to provide provisioning information 190 using, for example, a predetermined format. The provisioning information 180 may then be shared with the entities in the closed group identified by, for example, user equipment 114A.

Figure 3:
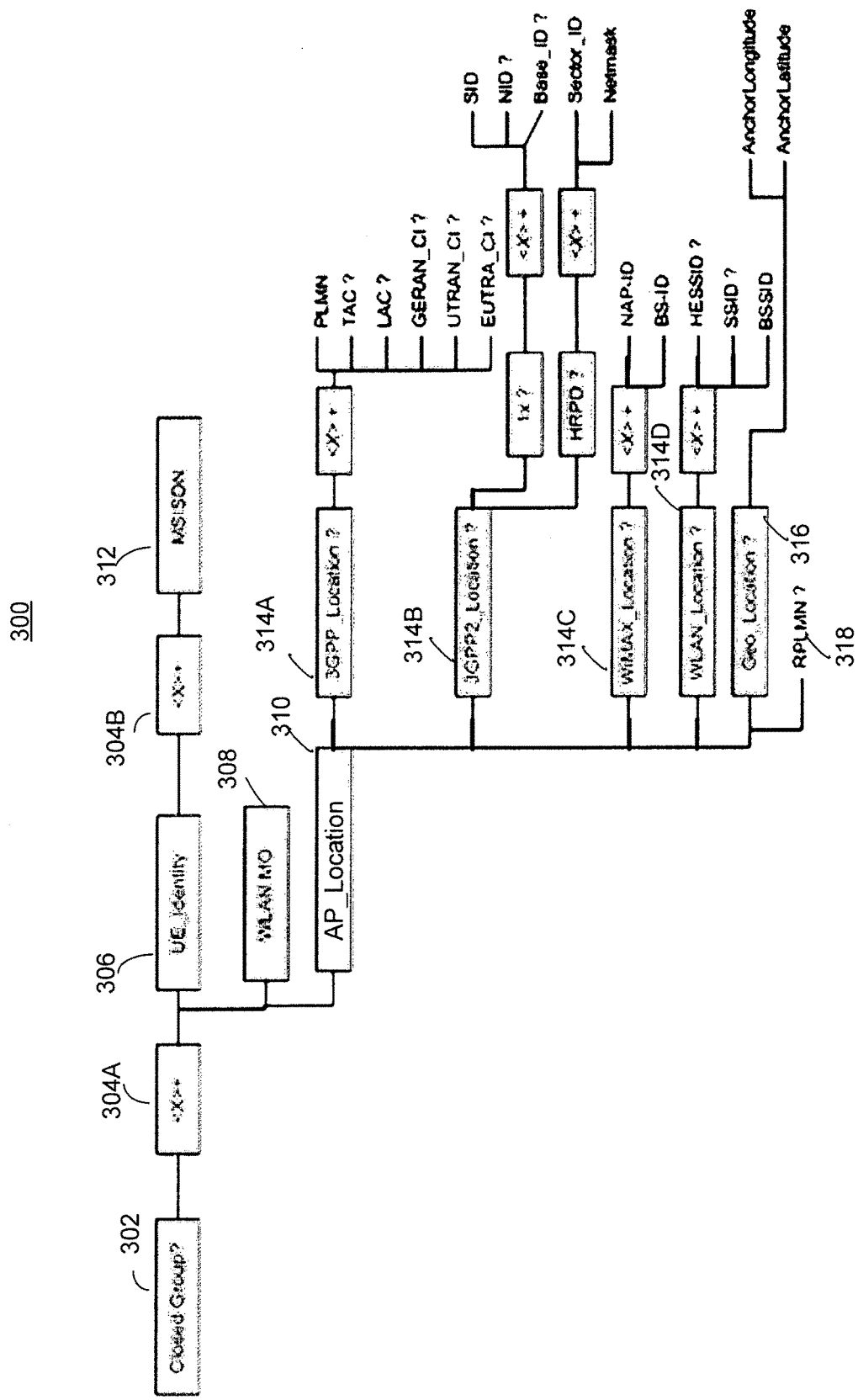
FIG. 3 depicts an example of provisioning information configured as a management object, in accordance with some example embodiments of the subject matter disclosed herein.

FIG. 3 depicts a graphical depiction of the parameters included in a predetermined format, such as for example a closed group management object 300. The closed group management object 300 may be configured as an ANDSF compatible management object, an OMA compatible management object, and/or any other mechanism for conveying provisioning information. In some example embodiments, the parameters of the management object 300 may include information identifying the closed group and provisioning information, such as for example policy information, discovery information, and location information.

In the example of FIG. 3, the management object 300 may include information represented graphically by one or more nodes, such as for example nodes 302-318. The management object 300 may include a closed group node 302 to identify a portion of the management object 300 that relates to a closed group. The "+" symbol at, for example, 304 represents one or more elements of the closed group that can be defined. The "?" symbol at, for example, 302 represents zero or more elements of the closed group that can be defined. The UE_identity node 306 represents a portion of the management object 300 including information identifying the closed group. For example, UE_identity node 306 may list the identity of one or more of the user equipment which are members of the closed group. In the example of FIG. 1, the UE_identity node 306 would list the identities of the user equipment 114A-C.

The management object 300 may also include, for example, a WLAN node 308 representing a portion of the management object 300 that includes information related to a wireless local area network information (WLAN), although in variations of management object 300 other network types are included in 300 as well.

The management object 300 may further include an access point location node 310 including information describing the location of the access point. The access point location node 310 may further be associated with a geolocation node 316 providing a latitude and a longitude for the access point, nodes 314A-C which includes information describing the 3GPP network, 3GPP2 network, WiMAX network, and WLAN networks discoverable at the location of the access point, and node 318 which includes information describing a registered public land mobile node discoverable at the location of the access point. Although FIG. 3 depicts nodes 302-318, these nodes are merely examples, as other types of nodes including information to be shared among the closed group of user equipment may be included as well in the management object 300. Moreover, the information depicted at management object 300 may be formatted, in some example embodiments, in accordance with the eXtensible markup language (XML) before being sent to network elements, such as for example user equipment 114A-C.

Figure 4:
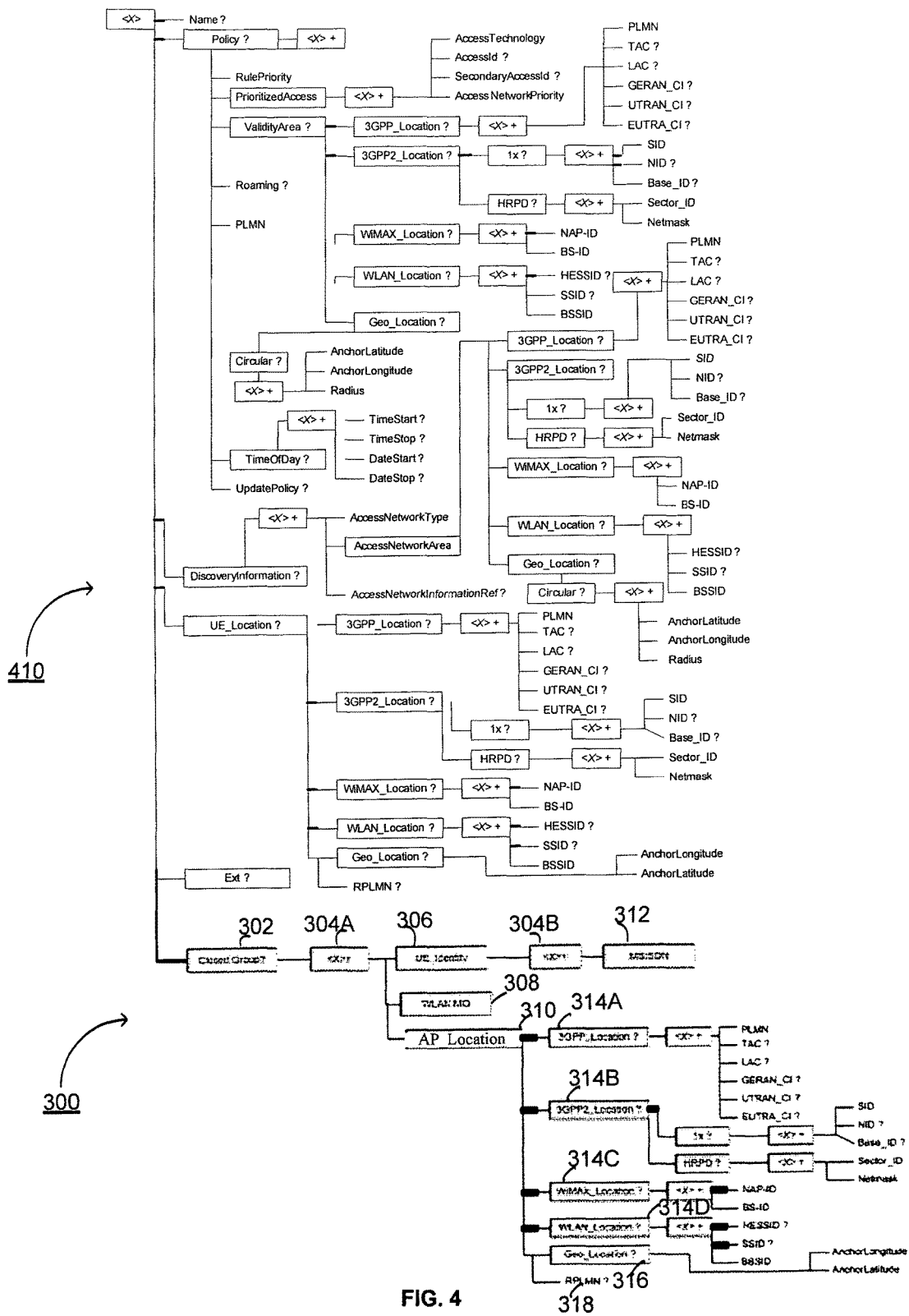

FIG. 4 depicts an ANDSF management object 400 consistent with some example embodiments. Referring to FIG. 4, the ANDSF management object 400 includes a typical ANDSF management object 410 and the closed group management object 300 described with respect to FIG. 3.

Figure 5:
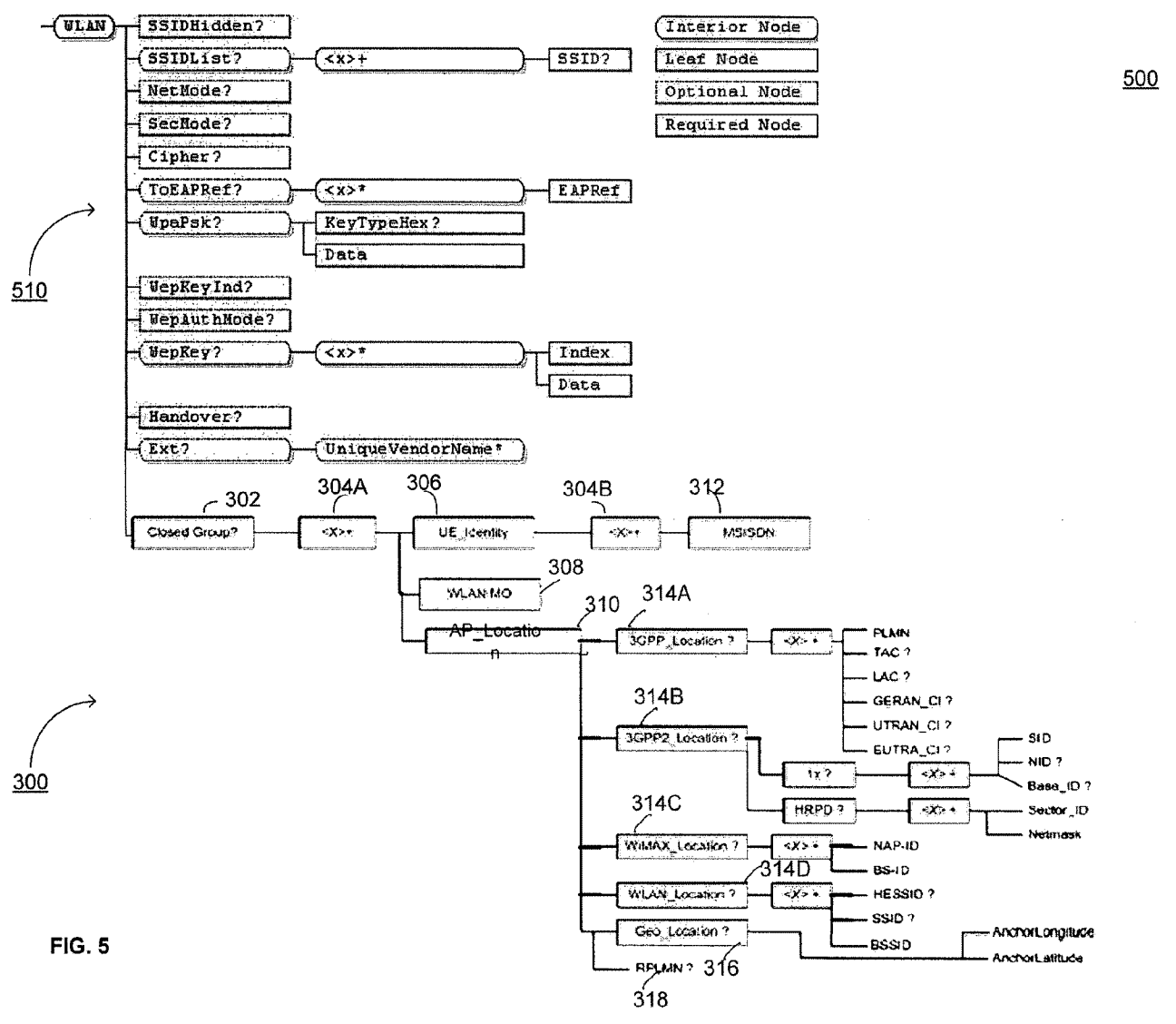

FIG. 5 depicts an OMA management object 500 consistent with some example embodiments. Referring to FIG. 5, the OMA management object 500 includes a typical OMA management object 510 and the closed group management object 300 described with respect to FIG. 3.

Referring again to FIG. 2, in some example embodiments, the generated provisioning information (which may be formatted as a management object 300) may be sent to one or more entities in the closed group. When this is the case, user equipment associated with the closed group may receive, at 220, one or more messages including the generated provisioning information formatted, for example, as management object 300. The received provisioning information enables the user equipment 114B-C to use the provisioning information to, in some example embodiments, configure network elements, such as for example access points 120B-C.

For example, the provisioning information configured as management object 300 may allow the user equipment 114A-C to share provisioning information, such that any of the user equipment 114A-C may couple to any of the access points 120A-C (as well as any corresponding cellular networks). For example, the shared provisioning information may allow a user equipment to determine the members of the closed group, the location of the access points, the location of any cellular networks, and authenticate to network elements including the access points.

Figure 6:
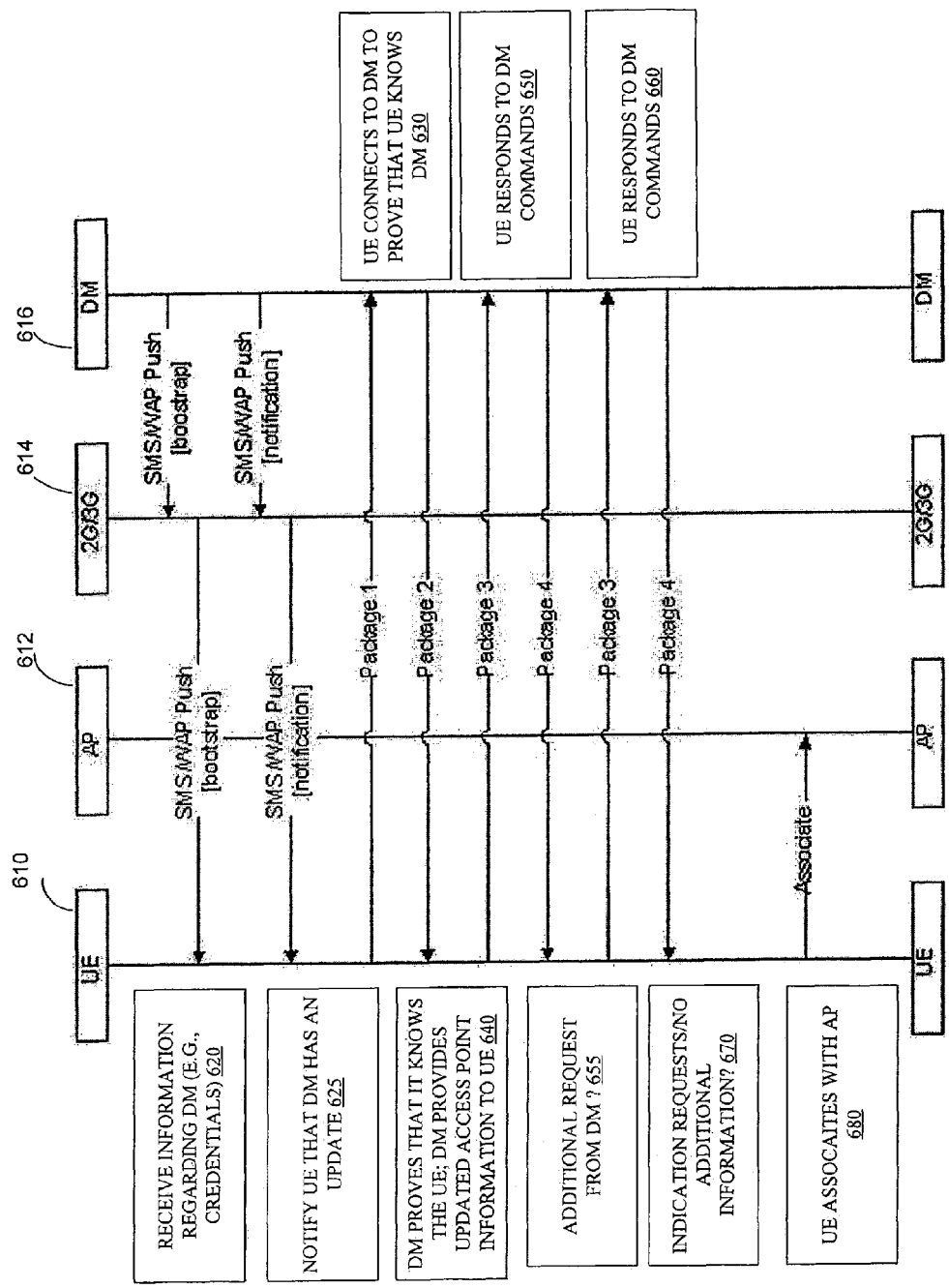
FIG. 6 depicts another example of a provisioning process, in accordance with some example embodiments of the subject matter disclosed herein.

FIG. 6 depicts a sequence diagram consistent with some example embodiments disclosed herein.

At 620, user equipment 610 receives, in some example embodiments, information from a device manager 616. The information may include credentials to enable an authentication (e.g., a short messaging service/wireless access protocol push-based authentication, a generic bootstrapping architecture (GBA) authentication, and the like) between the user equipment 610 and the device manager 616.

At 625, the device manager 616 notifies, in some example embodiments, the user equipment 610 that the device manager 616 has information to provide (e.g., update) to the user equipment 610. User equipment 610 may proceed to send first package at 630 to device manager without notification.

In some example embodiments, the user equipment 610 responds at 630 by sending a first package (e.g., one or more messages) to the device manager 616 to indicate that the user equipment 610 recognizes, as part of the authentication, the device manager 616.

At 640, the device manager 616 responds, in some example embodiments, by sending a second package (e.g., one or more messages) to the user equipment 610 to complete the authentication. The second package may also include device manager requests (e.g., commands) and/or provide, for example, provisioning information, which may be configured as a management object. For example, the provisioning information may include policy, discovery, and location information for the access point.

At 650, the device manager 616 receives, in some example embodiments, a third package including any responses to the requests (or commands). The device manager 616 may respond by sending a fourth package (e.g., one or more messages) to the user equipment 610 to provide additional requests (or commands) and/or provisioning information. FIG. 6 depicts at 655 and 660 that the exchange between the user equipment 610 and device manager 616 may continue until the device manager 616 indicates at 670 that there are no further commands and/or information to be sent (at least for the time being) to the user equipment 610.

In some example embodiments, the user equipment 610 may associate, at 680, with the access point 612. For example, the user equipment 610 may couple, based on the provisioning information provided by the device manager 616, to an access point 612.

Figure 7:
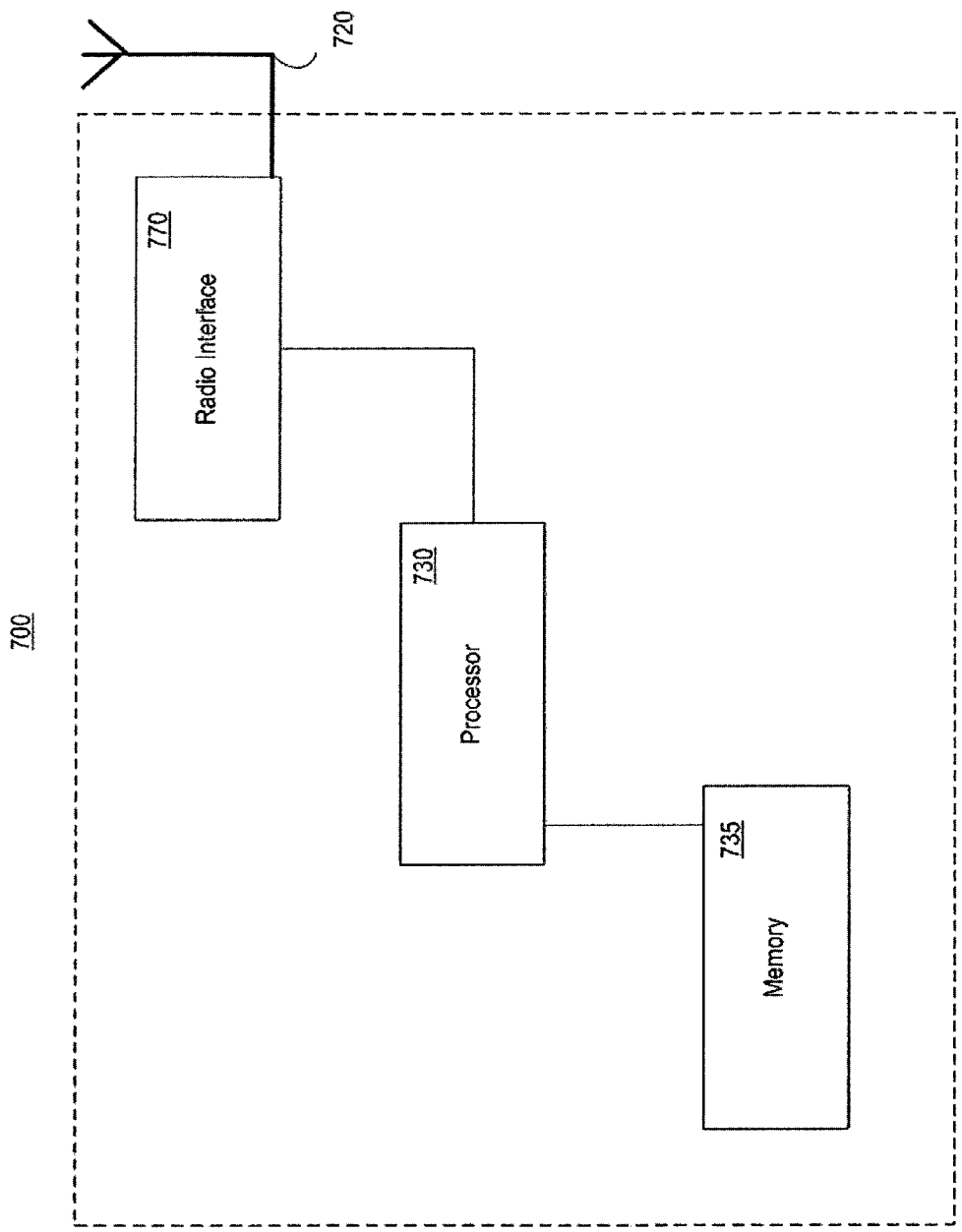
FIG. 7 depicts an example of user equipment, in accordance with some example embodiments of the subject matter disclosed herein.

FIG. 7 depicts an exemplary device 700 configured to be used as user equipment, such as for example user equipment 114A-C and user equipment 610, consistent with some example embodiments. The user equipment 700 may include one or more of the following: an antenna 720, a radio interface 770, which may include other components, such as for example filters, converters (e.g., digital-to-analog converters and the like), processors, symbol demappers, an Inverse Fast Fourier Transform (IFFT) module, and the like. In some implementations, the user equipment 700 may also be compatible with one or more of the following: IEEE 802.16, IEEE 802.11, LTE, LTE-Advanced, and the like. The user equipment 700 may further include at least one processor 730 for controlling the user equipment and for accessing and executing program code stored in at least one memory 735 (which configures the processor to perform operations as described above with respect to FIGS. 1-6 to provide and/or generate messages to share provisioning information within a closed group). Moreover, the at least one processor 730 may also provide and/or determine location information identifying the location of the user equipment. The at least one processor 730 may comprise one or more of the following: one or more microprocessors; one or more processors with, or without, accompanying digital signal processor(s); one or more special-purpose computer chips; one or more field-programmable gate arrays (FPGAS); one or more controllers; one or more application-specific integrated circuits (ASICS), and/or one or more computers. The at least one memory 735 may comprise one or more of the following: read-only memory, random access memory, FLASH memory, and any other mechanism configured to store and/or retain code/instructions to provide the operations discloses herein.

Figure 8:
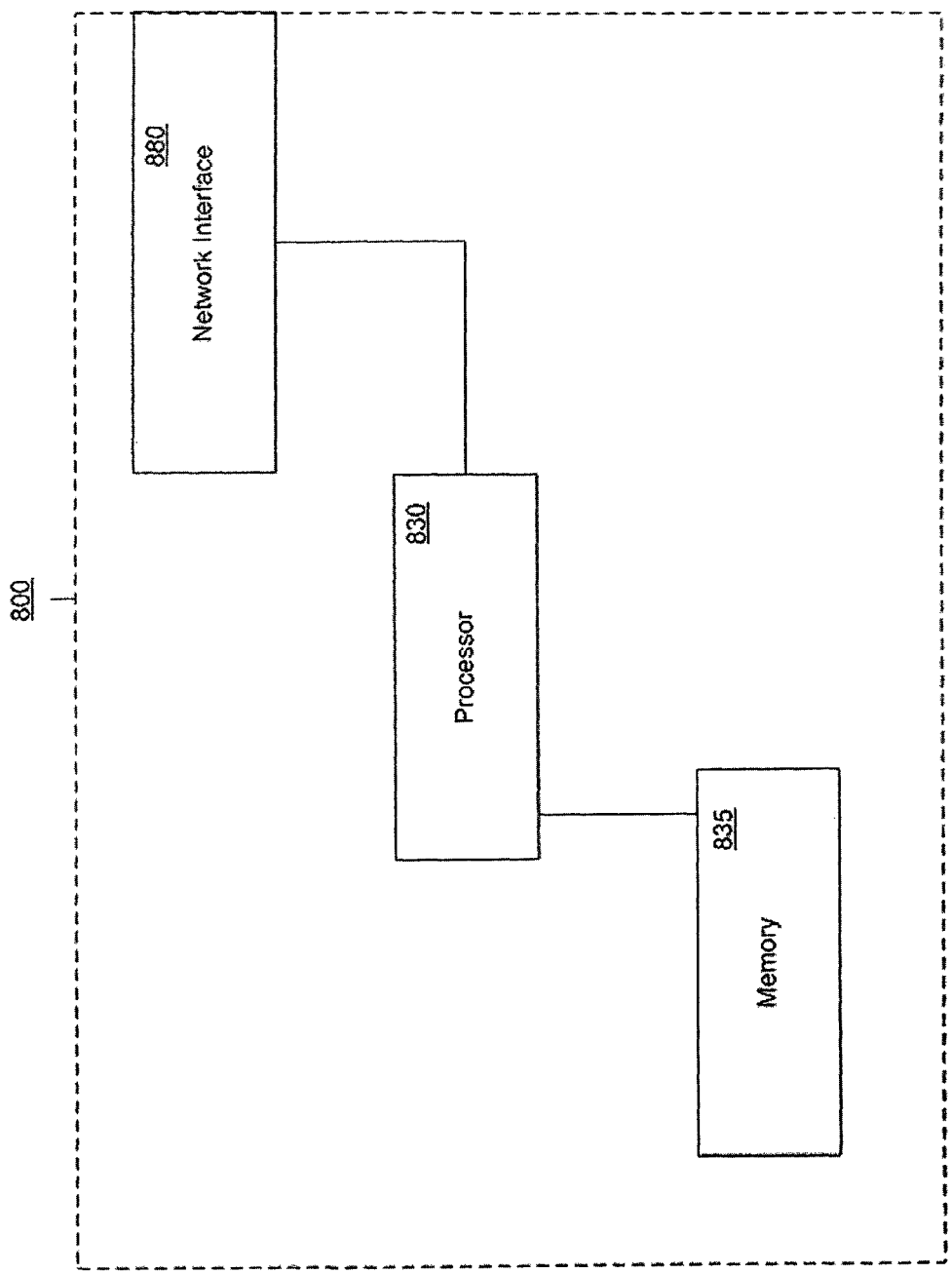
FIG. 8 depicts an example of a device manager, in accordance with some example embodiments of the subject matter disclosed herein.

FIG. 8 depicts an exemplary server 800 configured to be used as device manager 190 and 616, consistent with some example embodiments. The server 800 may include a network interface 880 for coupling to a wireless (e.g., in accordance with a standard, such as for example IEEE 802.16, LTE, LTE-Advanced, and the like), and/or a wired network. The server 800 further includes a processor 830 for controlling the server 800 as described above with respect to FIGS. 1-6 and for accessing and executing program code stored in memory 835 (which configures the processor to perform operations as described above with respect to FIGS. 1-6 to provide and/or generate messages to share provisioning information within a closed group). In some example embodiments, the server 800 may be coupled to (or included within) other network elements of a mobile cellular operator's core network. The at least one processor 830 may comprise one or more of the following: one or more microprocessors; one or more processors with, or without, accompanying digital signal processor(s); one or more special-purpose computer chips; one or more field-programmable gate arrays (FPGAS); one or more controllers; one or more application-specific integrated circuits (ASICS), and/or one or more computers. The at least one memory 835 may comprise one or more of the following: read-only memory, random access memory, FLASH memory, and any other mechanism configured to store and/or retain code/instructions to provide the operations discloses herein.

The features, structures, or characteristics described throughout this specification may be combined in any suitable manner in one or more embodiments. For example, the usage of the phrases "example embodiments," "some embodiments," or other similar language, throughout this specification refers to the fact that a particular feature, structure, or characteristic described in connection with an embodiment may be included in at least one embodiment described herein. Thus, appearances of the phrases "example embodiments," "in some embodiments," "in other embodiments," or other similar language, throughout this specification do not necessarily all refer to the same group of embodiments, and the described features, structures, or characteristics can be combined in any suitable manner in one or more embodiments.

In addition, while the term "message" has been used in the description herein, the message may comprise any form of signaling used to convey information. Moreover, a message may include information by, for example, including the actual information in the message, including a reference to the location of the actual information, or a combination of both.

As discussed above, various embodiments of the invention may be configured in numerous physical elements, or can be configured at a single network element, or configured in a number of elements having various disclosed functions distributed throughout.

The subject matter described herein may be embodied in systems, apparatus, methods, and/or articles depending on the desired configuration. For example, the user equipment, access points, device manager and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, apparatus and/or device (e.g., magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method comprising:
   receiving, from a user equipment, one or more first messages requesting that provisioning information be shared among a closed group within a wireless local area network, the closed group comprising a plurality of user equipment including the user equipment;
   generating, in response to receiving the one or more first messages, the provisioning information for the closed group, wherein the provisioning information includes policy information for a network utilized by the user equipment, discovery information for the network, and location information of the user equipment; and
   sending one or more second messages including the provisioning information to at least one of the plurality of user equipment to enable the sharing among the closed group.

2. The method of claim 1, wherein the one or more first messages comprise information identifying the closed group, wherein the information identifying the closed group includes at least one of a mobile subscriber integrated services digital network number, an international mobile subscriber identity, and an international mobile equipment identity.

3. The method of claim 1, wherein the generating further comprises:
   generating, at a device manager, at least one management object comprising the provisioning information for the closed group, wherein the device manager comprises at least one of an access network discovery and selection function or an open mobile alliance device manager.

4. The method of claim 1, wherein the receiving, the generating, and the sending are implemented by a device manager comprising at least one processor and at least one memory.

5. An apparatus comprising:
   at least one processor; and
   at least one memory including computer program code, the at least one memory and the computer program code configured to, with the at least one processor, cause the apparatus at least to:
   receive, from a user equipment, one or more first messages requesting that provisioning information be shared among a closed group within a wireless local area network, the closed group comprising a plurality of user equipment including the user equipment;
   generate, in response to receiving the one or more first messages, the provisioning information for the closed group, wherein the provisioning information includes policy information for a network utilized by the user equipment, discovery information for the network, and location information of the user equipment; and
   send one or more second messages including the provisioning information to at least one of the plurality of user equipment to enable the sharing among the closed group.

6. The apparatus of claim 5, wherein the one or more first messages comprise information identifying the closed group, wherein the information identifying the closed group includes at least one of a mobile subscriber integrated services digital network number, an international mobile subscriber identity, and an international mobile equipment identity.

7. A method comprising:
   providing, by a first user equipment, one or more first messages requesting that provisioning information be shared among a closed group within a wireless local area network, the closed group comprising a plurality of user equipment including the first user equipment and a second user equipment, wherein the provisioning information includes policy information for a network utilized by the second user equipment, discovery information for the network, and location information of the second user equipment; and
   receiving, by the first user equipment and in response to providing the one or more first messages, one or more second messages including the provisioning information shared among the plurality of user equipment of the closed group.

8. The method of claim 7, wherein the first user equipment provides the one or more first messages to a device manager of a mobile wireless network.

9. The method of claim 7, further comprising:
accessing, by the first user equipment, at least one of a plurality of access points based on at least the provisioning information received.

10. An apparatus comprising:
at least one processor; and
at least one memory including computer program code, the at least one memory and the computer program code configured to, with the at least one processor, cause the apparatus at least to:
provide one or more first messages requesting that provisioning information be shared among a closed group within a wireless local area network, the closed group comprising a plurality of user equipment including the apparatus and a second user equipment, wherein the provisioning information includes policy information for a network utilized by the second user equipment, discovery information for the network, and location information of the second user equipment; and
receive, in response to providing the one or more first messages, one or more second messages including the provisioning information shared among the plurality of user equipment of the closed group.

11. The apparatus of claim 10, wherein the one or more first messages are provided to a device manager of a mobile wireless network.

12. The apparatus of claim 10, wherein the apparatus is further configured to at least authenticate with a device manager of a mobile wireless network before providing the one or more first messages.

13. The apparatus of claim 10, wherein the apparatus is further configured to at least:
access at least one of a plurality of access points based on at least the provisioning information received.

14. A computer program product comprising non-transitory machine-readable medium storing instructions that, when executed by at least one processor, cause the at least one processor to perform operations comprising:
receiving, from a user equipment, one or more first messages requesting that provisioning information be shared among a closed group within a wireless local area network, the closed group comprising a plurality of user equipment including the user equipment;
generating, in response to receiving the one or more first messages, the provisioning information for the closed group, wherein the provisioning information includes policy information for a network utilized by the user equipment, discovery information for the network, and location information of the user equipment; and
sending one or more second messages including the provisioning information to at least one of the plurality of user equipment to enable the sharing among the closed group.

15. The computer program product of claim 14, wherein the one or more first messages comprise information identifying the closed group, wherein the information identifying the closed group includes at least one of a mobile subscriber integrated services digital network number, an international mobile subscriber identity, and an international mobile equipment identity.

16. The computer program product of claim 14, wherein the generating further comprises:
generating, via a device manager, at least one management object comprising the provisioning information for the closed group, wherein the device manager comprises at least one of an access network discovery and selection function or an open mobile alliance device manager.

17. A computer program product comprising non-transitory machine-readable medium storing instructions that, when executed by at least one processor, cause the at least one processor to perform operations comprising:
providing one or more first messages requesting that provisioning information be shared among a closed group within a wireless local area network, the closed group comprising a plurality of user equipment including a user equipment comprising the at least one processor and a second user equipment, wherein the provisioning information includes policy information for a network utilized by the second user equipment, discovery information for the network, and location information of the second user equipment; and
receiving, in response to providing the one or more first messages, one or more second messages including the provisioning information shared among the plurality of user equipment of the closed group.

18. The computer program product of claim 17, wherein the operations further comprise:
accessing at least one of a plurality of access points based on at least the provisioning information received.

19. A method comprising:
receiving, from a first user equipment, one or more first messages requesting that provisioning information be shared among a closed group within a wireless local area network, the closed group comprising a plurality of second user equipment and the first user equipment;
generating, in response to receiving the one or more first messages, the provisioning information for the closed group, wherein the provisioning information includes policy information for a network utilized by the first user equipment, discovery information for the network, and location information of the first user equipment; and
sending one or more second messages including the provisioning information to at least one of the plurality of second user equipment to enable the sharing among the closed group.

* * * * *